United States Patent
Gu et al.

(10) Patent No.: US 9,967,751 B2
(45) Date of Patent: May 8, 2018

(54) MOBILE NETWORK-BASED TENANT NETWORK SERVICE IMPLEMENTATION METHOD, SYSTEM, AND NETWORK ELEMENT

(71) Applicant: ZTE CORPORATION, Shenzhen, Guangdong Province (CN)

(72) Inventors: Zhongyu Gu, Shenzhen (CN); Zaifeng Zong, Shenzhen (CN); Jing Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/350,351

(22) Filed: Nov. 14, 2016

(65) Prior Publication Data

US 2017/0078888 A1  Mar. 16, 2017

Related U.S. Application Data

(62) Division of application No. 14/440,891, filed as application No. PCT/CN2013/001013 on Aug. 26, 2013, now Pat. No. 9,532,339.

(30) Foreign Application Priority Data

Nov. 6, 2012 (CN) .......................... 2012 1 0438444

(51) Int. Cl.
*H04W 16/02* (2009.01)
*H04W 8/02* (2009.01)
(Continued)

(52) U.S. Cl.
CPC ............. *H04W 16/02* (2013.01); *H04L 45/02* (2013.01); *H04W 8/02* (2013.01); *H04W 8/20* (2013.01);
(Continued)

(58) Field of Classification Search
CPC ....... H04W 16/02; H04W 8/02; H04W 76/02; H04W 72/0406; H04W 12/06; H04W 8/20; H04L 45/02
See application file for complete search history.

(56) References Cited

U.S. PATENT DOCUMENTS

2012/0159572 A1* 6/2012 Patel .................. G06F 21/6218
726/3

FOREIGN PATENT DOCUMENTS

CN    101868036 A    10/2010
CN    101998348 A    3/2011
(Continued)

*Primary Examiner* — Nam Huynh
(74) *Attorney, Agent, or Firm* — Ling Wu; Stephen Yang; Ling and Yang Intellectual Property

(57) ABSTRACT

A mobile network-based tenant network service implementation method and system and network elements are disclosed. The method includes: an MME of a mobile network performing identity authentication of a tenant network to which UE belongs on the UE; after the UE passes the identity authentication of tenant network, the MME selecting a local exchange node for the UE; the MME transmitting a creation/update message of a local exchange forwarding table to the local exchange node; the local exchange node creating or updating the local exchange forwarding table and generating a forwarding table entry of UE, wherein the forwarding table entry comprises identification information of UE; after UE bearers establishment are completed, the local exchange node writing UE bearer information into the forwarding table entry of UE; and the local exchange node implementing message forwarding of the tenant network according to the local forwarding table, thereby implementing a tenant network service.

7 Claims, 6 Drawing Sheets

(51) Int. Cl.
- *H04W 76/02* (2009.01)
- *H04L 12/751* (2013.01)
- *H04W 72/04* (2009.01)
- *H04W 12/06* (2009.01)
- *H04W 8/20* (2009.01)
- *H04L 12/741* (2013.01)

(52) U.S. Cl.
CPC ....... *H04W 12/06* (2013.01); *H04W 72/0406* (2013.01); *H04W 76/02* (2013.01); *H04L 45/54* (2013.01)

(56) References Cited

FOREIGN PATENT DOCUMENTS

| | | |
|---|---|---|
| CN | 102404185 A | 4/2012 |
| CN | 102664864 A | 9/2012 |

\* cited by examiner

MOBILE NETWORK-BASED TENANT NETWORK SERVICE IMPLEMENTATION METHOD, SYSTEM, AND NETWORK ELEMENT

RELATED APPLICATION

This is a divisional application of application Ser. No. 14/440,891, filed on Jun. 5, 2015, which is a national stage application under 35 U.S.C. 154(d)(4) and 35 U.S.C. 371 for PCT/CN2013/001013, filed on Aug. 26, 2013 and claimed priority under 35 U.S.C. 119(a) and 35 U.S.C. 365(b) to Chinese Patent Application No. CN201210438444.4, filed on Nov. 6, 2012.

TECHNICAL FIELD

The present document relates to a communication field, in particular to a mobile network-based tenant network service (Network as a Service, NaaS for short) implementation method (including a service establishment method and a charging method) and system and network elements (including a mobility management entity, mobile network elements and a NaaS service development and management function entity).

Background of the Related Art

Due to features such as high flexibility and great convenience of a mobile network and reasons such as that the price is increasingly suitable for the mass consumption market, the mobile network is developed at a high speed, the number of subscribers of the existing mobile network has already exceeded the number of the subscribers of a fixed network, and comparatively universal network coverage has already been obtained.

Since the mobile network has developed at the stage of LTE/LTE+, and possesses broadband features and increasingly wide deployment, it will become increasingly popular to use LTE for a broadband access method. As the introduction of LTE, the shared bandwidth for uplink and downlink in LTE has already reached at 50 Mbps and 100 Mbps, respectively. While the LTE+ bandwidth can reach at 500 Mbps. Therefore, a mobile network has already been capable of supporting broadband access like that of a fixed access network. In other words, after the mobile network is developed to the LTE stage, broadband access demands of subscribers can be satisfied, and especially after introducing a Home eNB (Node B) (HeNB)/femtocell (which is a super-miniature mobile base station put forward in recent years according to 3G development and mobile broadbandization trends) and a small cell. That is to say, LTE can satisfy universal access of broadband, including access at Ethernet rate similar to enterprise internal networks, i.e., 10M, 100M and even higher-rate access can be satisfied.

At the modern times that the mobile network and the broadband network are developed at high speed, another concept, i.e., cloud computing, becomes increasingly hot with the wide development and use of services, i.e., Infrastructure as a Service (IaaS), Software as a Service (SaaS) and Platform as a Service (PaaS), and the application thereof also becomes increasingly popular. With the deepening of IaaS application development, a new service-Network as a Service (NaaS), i.e., network service can be further developed and is called as a tenant network service in the present document. NaaS refers to providing network functions such as network access, switching and routing for clients through the networks of operators, so as to provide the subscribers with the networks similar to physical networks established by enterprise clients. This has the advantage that the subscribers can focus on their own services without distracting on non-main services such as network construction and maintenance. In addition, by managing and supporting the by the operators, higher network security can be obtained, use on demand can be realized and better cost performance can be achieved.

Due to the previously described universal access features of the mobile network, thereby, the mobile network technology can also be used for implementing NaaS. By introducing NaaS related function entities into the mobile network, the NaaS function can be implemented, so that the NaaS service development becomes more popular and more subscribers can be covered. Further, by implementing NaaS in the mobile network, more service income can be brought to mobile network operators, so that network resources can be more widely used and the resource utilization ratio is higher. Besides, virtualization of the mobile network can be implemented by supporting different tenant networks/virtual networks of different clients.

However, the traditional mobile network mainly provides the services supporting single subscriber, such as a telephone service and an INTERNET access service.

FIG. 1 is a network structure diagram of the typical $3^{rd}$ Generation Partnership Project (3GPP) Long Term Evolution (LTE)/System Architecture Evolution (SAE), wherein UE is a user terminal equipment, an evolved Node B (eNB) is a base station equipment, an Serving Gateway (S-GW) is a gateway for serving and a Packet Data Network Gateway (P-GW or PDN-GW) configured to connect with an external Internet Protocol (IP) network. A Mobility Management Entity (MME) is responsible for a management function, and a policy and charging rules function is used for implementing policy and charging control. The P-GW allocates an IP address for a subscriber, and related default bearers and dedicated bearers need to be established between the UE and the P-GW through the eNB and the S-GW to implement connections of related services.

FIG. 2 is a flowchart of a typical registration, IP address allocation and service usage of an LTE/SAE network, which comprises the following steps:

In Step 201, it is to perform a random access process. When a subscriber registers to a network, a Radio Resource Control (RRC) connection needs to be established between a terminal and the network through this process.

In Step 202, the terminal transmits a registration request including an identity thereof to MME. The identity may be an International Mobile Subscriber Identity (IMSI) and also an effective S-Temporary Mobile Subscriber Identity (S-TMSI).

In Step 203, it is to perform an Authentication and Key Agreement process (AKA). When the MME extracts the subscriber identity, the MME starts the AKA process to implement mutual authentication between the network and the terminal.

In Step 204, it is to perform a location update and subscriber data insert (and confirmation) process between the MME and a Home Subscriber Server (HSS).

In Step 205, the MME transmits a bearer establishment request to a P-GW.

In Step 206, the P-GW performs subscriber IP address allocation, etc. and returns a creation bearer response. In this message, an IP address allocated to the subscriber is returned.

In Step 207, the MME transmits an initial context request message to an eNB, wherein the initial context request message includes a registration acceptance (also called as connection acceptance) message transmitted to the UE and the registration acceptance message carries information, such as the IP address, etc.

In Step 208, the eNB transmits an RRC connection reconfiguration message to the UE, wherein the RRC connection reconfiguration message carries the registration acceptance message transmitted to the UE and the registration acceptance message carries information such as the IP address.

In Step 209, after RRC connection reconfiguration is completed, the UE transmits an RRC connection reconfiguration response message to the eNB.

In Step 210, the eNB transmits a registration completion (also called as connection completion) message to the MME.

In Step 211, after the UE obtains the IP address, it is to perform related service processes (such as WWW browsing and IMS application) through the established default/dedicated bearers.

Although services such as group telephone/small number dialing are supported in the existing mobile network and IP Virtual Private Network (VPN) services on the mobile network are supported, the implementation of these services has a longer distance from the implementation of the NaaS service. Specifically, the existing mobile network technology cannot implement the NaaS service.

Supports provided by the mobile network to enterprise networks are comparatively few. For example, the implementation of a Virtual Private Dial-up Network (VPDN) based on Layer 2 Tunneling Protocol (L2TP), an UE based IPsec VPN technology or the like cannot support the implementation of a plurality of enterprise networks in the mobile network, isolation between the different enterprise networks, and, the isolation between the enterprise network the mobile network itself, etc. In addition, even though related VPN functions are implemented, i.e., the access of virtual networks is implemented in the existing mobile network implementation mechanism, service switching on the PDN-GW is needed, and Under the situation that the UE implements enterprise network access by a same eNB, if traffic of the enterprise networks is switched via the P-GW, the bandwidth of backhaul networks is greatly wasted, unnecessary traffic pressure is caused to related Gateways (GW) and thus it is not reasonable. Therefore, new solutions are needed.

SUMMARY

The technical problem to be solved by the present document is to provide a mobile network-based tenant network service (Network as a Service, NaaS for short) implementation method (including a service establishment method and a charging method) and system and network elements (including a mobility management entity, a mobile network element and an NaaS service development and management function entity), so as to solve the problem that the tenant networks cannot be implemented in the existing mobile network.

In order to solve the above-mentioned problem, the present document provides a mobile network-based tenant network service implementation method, the method comprises:

a Mobility Management Entity (MME) of a mobile network performing mobile network access authentication on a User Equipment (UE), and after the UE passes the network access authentication and possesses a tenant network attribute, performing identity authentication of a tenant network to which the UE belongs on the UE;

after the UE passes the identity authentication of the tenant network, the MME selecting a local exchange node for the UE;

the MME initiating bearer establishment and/or dedicated bearer establishment of the UE and transmitting a creation/update message of a local exchange forwarding table to the local exchange node;

the local exchange node creating or updating the local exchange forwarding table and generating a forwarding table entry of the UE, wherein the forwarding table entry comprises identification information of the UE; after UE bearers establishment is completed, the local exchange node writing UE bearer information into the forwarding table entry of the UE; and the local exchange node implementing message forwarding of the tenant network according to the local forwarding table, thereby implementing a tenant network service.

In order to solve the above-mentioned problem, the present document further provides a mobile network-based tenant network service charging method, the method comprises:

a Network as a Service (NaaS) service development and management function entity collecting charging information of a tenant network; and the NaaS service development and management function entity performing tenant network charging according to preset policies and the collected charging information of the tenant network.

In order to solve the above-mentioned problem, the present document further provides a Mobility Management Entity (MME), the MME comprises:

an authentication module, configured to perform tenant network identity authentication on a User Equipment (UE) after the UE passes mobile network access authentication and when the UE possesses a tenant network attribute;

a local exchange node selection module, configured to select a local exchange node for the UE after the UE passes the tenant network identity authentication;

a bearer establishment control module, configured to initiate bearer establishment and/or dedicated bearer establishment of the UE; and a routing processing module, configured to transmit a creation/update message of a local exchange forwarding table to the local exchange node.

In order to solve the above-mentioned problem, the present document further provides a mobile network element, wherein the mobile network element comprises a forwarding table management module, a bearer establishment module and a data message forwarding module, and when the mobile network element serves as a local exchange node of a tenant network:

the bearer establishment module is configured to establish bearers, wherein the bearers comprise UE bearers and connection bearers between the local exchange nodes of the tenant network, bearers accessing the INTERNET or offload bearers;

the forwarding table management module is configured to receive a creation/update message of a local exchange forwarding table of a tenant network terminal transmitted by a-Mobility Management Entity (MME), create or update a local exchange forwarding table, generate or update a forwarding table entry of the tenant network terminal, and write UE bearer information into the forwarding table entry of the UE after the UE bearers are established, wherein the forwarding table entry comprises identification information of the UE; and the data message forwarding module is configured to forward a data message of the tenant network terminal according to the forwarding table of the tenant network terminal.

In order to solve the above-mentioned problem, the present document further provides a Network as a Service (NaaS) service development and management function entity, the function entity comprises:

a subscription management module, configured to accept and manage service application or subscription of a tenant network; and a tenant network management module, configured to manage terminals accessing to the tenant network.

In order to solve the above-mentioned problem, the present document further provides a mobile network-based tenant network service implementation system, which comprises a Mobility Management Entity (MME), mobile network elements, and a Network as a Service (NaaS) service development and management function entity.

The above-mentioned methods and system, by introducing the NaaS service development and management function entity into the mobile network and extending the functions of related network elements for the existing mobile network, a function of network as a service can be implemented, thus the service range of the existing mobile network can be greatly extended, new incomes are brought to the mobile network operators and the resource utilization ratio of the mobile network is improved.

PREFERRED EMBODIMENTS OF THE INVENTION

The technical solutions in the embodiments of the present document will be clearly and completely described below in combination with the drawings in the embodiments of the present document. Obviously, the described embodiments are just partial embodiments, instead of all embodiments of the present document. All other embodiments obtained by one skilled in the art without contributing any inventive labor based on the embodiments in the present document should belong to the protection scope of the present document.

Embodiment 1

Figure 1:
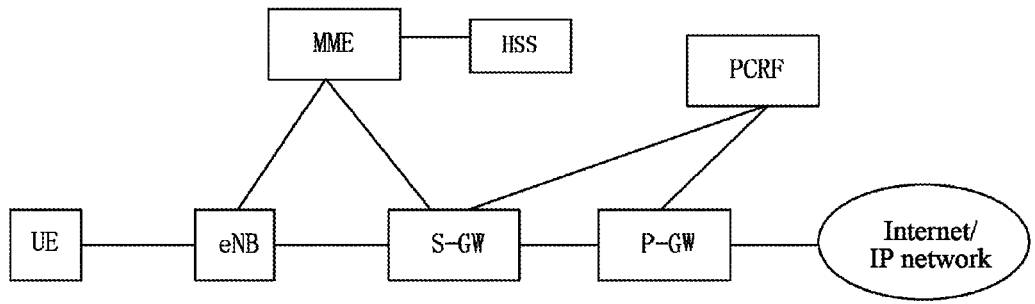
FIG. 1 is a diagram of a typical 3GPP LTE/SAE network architecture.
Figure 2:
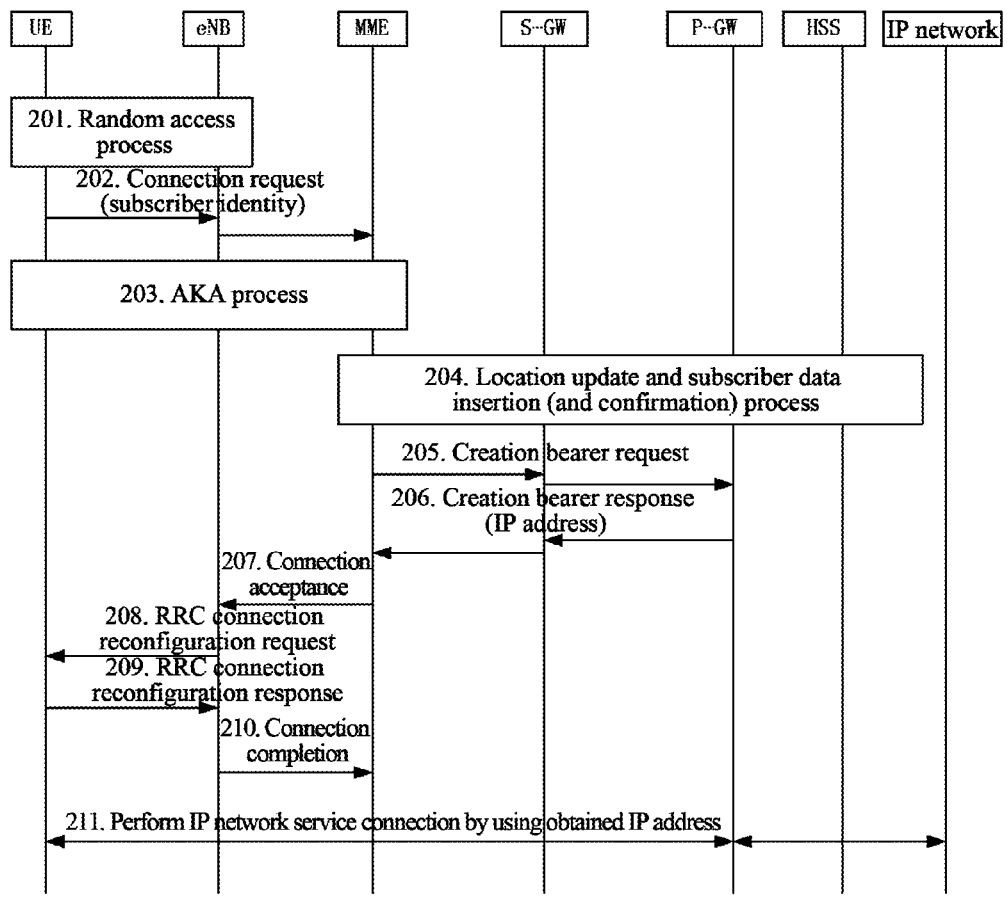
FIG. 2 is a schematic flowchart of typical registration, IP address allocation and service use of an LTE/SAE network.
Figure 3:
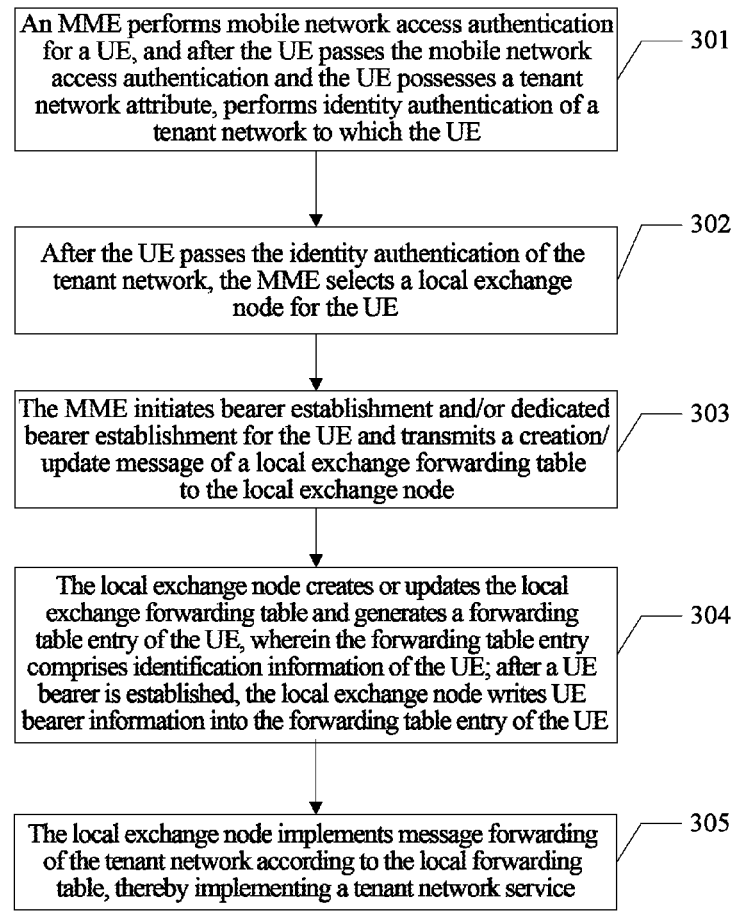
FIG. 3 is a schematic flowchart of embodiment 1 of a mobile network-based tenant network service implementation method according to the present document.

Embodiment 1 of a mobile network-based tenant network service implementation method of the present document is as shown in FIG. 3, wherein the method comprises the following steps:

In Step 301, an Mobility Management Entity (MME) of a mobile network performs mobile network access authentication on a User Equipment (UE), and performs identity authentication of a tenant network to which the UE belongs on the UE after the UE passes the mobile network access authentication and the UE possesses a tenant network attribute;

It needs to be illustrated that the tenant network is a network name defined by the present document aiming at service product of Network as a Service (NaaS), the network name is also called as an enterprise network, a local network or the like, and the name thereof does not have a essential influence on the present document.

A subscriber applies a tenant network, and related tenant network information, such as a network identifier, information indicating which UE can be used as access terminals to access the tenant network and related subscriber identity authentication information, is formed. The tenant network attribute information of the UE is injected into a Home Subscriber Server (HSS), the MME obtains subscription data information of the UE, including the tenant network attribute information of the UE, from the HSS in the authentication process when the UE accesses the mobile network authentication process, and the MME can perform tenant network identity authentication accordingly.

Specifically, after performing the mobile network access authentication for the UE in the process of the UE accessing the network, the MME performs the tenant network identity authentication for the UE according to the tenant network attribute of the UE. Specifically, after the UE enters an LTE network, whether the UE needs to access the tenant network thereof or not can be further determined according to the attribute of the UE, if the UE needs to access to the tenant network thereof, the UE needs to further pass the identity authentication of the tenant network thereof, and after the UE passes the identity authentication, the UE can accesses the tenant network; and after the UE accesses the INTERNET as common UE, the access of the tenant network is performed based on a tenant network access application explicitly initiated by the UE.

In Step 302, after the UE passes the identity authentication of the tenant network, the MME selects a local exchange node for the tenant network terminal;

The MME can select a preset network element as a local exchange node, or select a common node of the tenant network terminal and the existing local exchange node according to a near-terminal principle as the local exchange node of the tenant network terminal.

Specifically, the preset network element and the local exchange node can be respectively an evolved Node B (eNB), an Serving Gateway (S-GW) or a Packet Data Network Gateway (P-GW), an Home eNB (HeNB) and a small cell.

In Step 303, the MME initiates bearer establishment and/or dedicated bearer establishment of the UE and transmits a creation/update message of a local exchange forwarding table to the local exchange node;

Specific forwarding table entry information can at least include identification information of the UE, which is generally an INTERNET protocol (IP) address of the UE; and connection information corresponding to the address, which specifically refers to bearer information related to the UE. Specifically, the bearer information is added into the forwarding table after the bearers of the UE are established. In addition, the UE identification information in the forwarding table entry uses IP address information which is the very popular at present, but the use of other identification information such as International Mobile Subscriber Identity (IMSI)/S-Temporary Mobile Subscriber Identity (S-TSMI) of the UE is not excluded, which does not influence the essential contents of the present document.

Preferably, the IP address is allocated by an NaaS service development and management function entity after the UE passes the tenant network identity authentication. The IP address can also be allocated by the P-GW or subscribed agreement in advance.

When the local exchange node such as eNB/S-GW/P-GW receives a command of establishing a local exchange table or receives a command of updating the local exchange table under a situation that the local exchange table has already existed, the local exchange node completes the establishment of the forwarding table and/or updates the information of the forwarding table.

In order to implement a tenant network service, a series of commands/messages are needed to implement information exchange between related service nodes and transmission of specific operating commands. This can be implemented by various methods. One implementation method is to define a bran-new command protocol between the mobile network elements. However, a comparatively feasible method is to extend the existing protocol to complete the function to be completed by the present document, so as to prevent the existing protocol system from being greatly modified. For example, when the local exchange node is an Serving Gateway (S-GW) or a Packet Data Network Gateway (P-GW), the creation/update message of the local exchange forwarding table of the UE is born by extending a creation bearer request message; and when the local exchange node is an evolved Node B (eNB) or an Home eNB (HeNB) or a small cell, the creation/update message of the local exchange forwarding table of the UE is born by extending a connection acceptance request message.

It needs to be illustrated that, although the establishment of the bearer is performed by still using the bearer establishment message of the UE, since a concept of the local exchange node exists during implementation of the tenant network, the bearers of the UE of the tenant network here are not all bearers including radio bearers of the UE, bearers from the eNB to the S-GW and bearers from the S-GW to the P-GW in the existing mobile network technology, but one or more above-mentioned bearers is properly selected to implement the connection between the tenant network and the UE and the possible connection between a plurality of different local exchange nodes. Of course, if some bearers thereof are configured to be selected, the remaining bearers may not be established any longer, so that the processing flow can be simplified and the resource overhead can be reduced. In addition, a connection bearer establishment message between different local exchange nodes may not include the UE attribute for UE bearer establishment, but is an independent bearer establishment command/message.

It needs to be further illustrated that the dedicated bearers here refer to connection bearers between a plurality of local exchange nodes of the tenant network, or connection bearers for the tenant network to access the INTERNET, or offload connection bearers. The establishment of these dedicated bearers is different from the establishment of the UE bearers. However, the bearer establishment can be performed by similar extension of the command/message described above for the establishment of the UE bearers. Carried parameters are merely different. For example, connection end points of the bearers may carry IP address information, etc. when the UE accesses the INTERNET. Through these dedicated bearers, the networking of the tenant network (connection of related local exchange nodes) can be implemented and the access of the INTERNET can be implemented, or the connection with other subnets/tenant networks of other networks of subscribers of the tenant network can be further implemented.

In Step 304, the local exchange node creates or updates the local exchange forwarding table and generates a forwarding table entry of the UE, wherein the forwarding table entry comprises identification information of the UE; after a UE bearer is established, the local exchange node writes UE bearer information into the forwarding table entry of the UE;

According to the specific location distribution of the terminal UE accessing the tenant network, the MME can select one or more local exchange nodes for a same tenant network, In order to implement the tenant network service, the MME initiates the establishment of the connection bearers between the local exchange nodes of the tenant network and implements synchronization of all the local exchange nodes for the tenant network. It needs to be further illustrated that the solution of implementing the synchronization by the MME is a preferred solution. Other synchronization implementation solutions are not excluded. For example, each local exchange node can use the routing protocol mechanism of the existing IP network to implement the synchronization of the forwarding table entries.

Specifically, based on different application scenarios, the bearers and/dedicated bearers of the UE described in the present document include but not limited to the bearers implemented by the mobile network for the UE, including radio bearers, bearers between the eNB and the S-GW, bearers between the S-GW and the P-GW, roaming bearers (which refer to bearers between an S-GW of a visited network and an P-GW of a home network), and dedicated bearers such as dedicated connection bearers between different exchange nodes for implementing the tenant network, dedicated bearers which support the tenant network to implement INTERNET access, and offload network connection/connection tunnels (bearers between local exchange nodes and tenant networks of a broadband network or a fixed network).

Further, the local exchange forwarding table is associated with offload bearers to implement=correlation between the tenant network and other networks/network functions. Further, correlation with other network functions such as Dynamic Host Configuration Protocol (DHCP) servers or Domain Name System (DNS) servers can also be implemented to perform IP address allocation and domain name resolution, or further introduce network security functions such as firewalls, and various servers, etc.

It is illustrated that, when the tenant network has a plurality of local exchange nodes, the plurality of local exchange nodes form a local exchange node tree (excluding complex connection manners such as loop connection), so as to guarantee the effective connection and implementation for the tenant network.

It is illustrated that, in order to implement the networking connection and INTERNET access of the tenant network and the connection of other networks through offload connection, setting processing also needs to be performed for the forwarding tables of related access nodes and synchronization for the forwarding tables of the local exchange nodes of the tenant network needs to be implemented. Specifically, the setting processing processes include setting related to INTERNET access routing, forwarding table entry setting of offload connection, synchronization between different forwarding tables, correlation between the forwarding table entries and dedicated bearers, etc. For these processing processes, please refer to description in follow-up embodiments.

The sequence of establishing bearers and creating or updating local exchange forwarding tables is not limited in the present document and can be changed according to flows under specific application scenarios. However, after table entries of the local exchange forwarding tables and service bearers are established, a correlation relationship between the table entries and the service bearers is established.

In Step 305, the local exchange node implements messages forwarding of the tenant network according to the local forwarding table, thereby to implement a tenant network service.

The data messages are data messages between tenant network terminals of the same tenant network, or data messages between the tenant network terminal and the INTERNET or between servers in the tenant network, etc.

In the above-mentioned embodiment, a supporting function for implementing the NaaS service is added in the MME. In the mobile network, the NaaS service development and management function entity which is independent of the existing mobile network elements or which is added on the existing certain mobile network element needs to be added to be responsible for functions related to the development of the NaaS service, including the identity authentication of the tenant network, the acceptance of service subscription for the tenant network, the charging function of the tenant network, etc., and further including supporting the MME to implement the selection of the local exchange nodes. Specifically, after the UE passes the tenant network identity authentication, the MME judges whether the UE and other UE of the tenant network thereof are jointly located in the same eNB or S-GW/P-GW or not (Since a plurality of MMEs may exist in the mobile network, the NaaS service development and management function entity is further needed to join in this judgment. Specifically, two UE are located in the same eNB but these two UE are allocated to different MMEs for processing due to a reason of load balancing, and thus the MME may be caused to consider that there is only one UE located in the eNB. Under this situation, the MME needs to transmit specific location information related to the UE to the NaaS service development and management function entity, which then uniformly manage specific access point information of the tenant network, so as to implement determination of a reasonable local exchange node. Specifically, the MME needs to interact with the NaaS service development and management function entity for once to query whether other UEs managed by other MMEs in the tenant network access the eNB or not, such that whether other UE are located in the eNB or not can be judged. Here, if there is only one MME in the mobile network, this interaction process can be omitted, such that the processing flow can be optimized). If so, the MME issues a command of establishing a local exchange forwarding table to the related eNB/S-GW/P-GW, or updates the local exchange forwarding table according to the information of the UE under the situation that the local exchange forwarding table has already existed.

Embodiment 2

Figure 4:
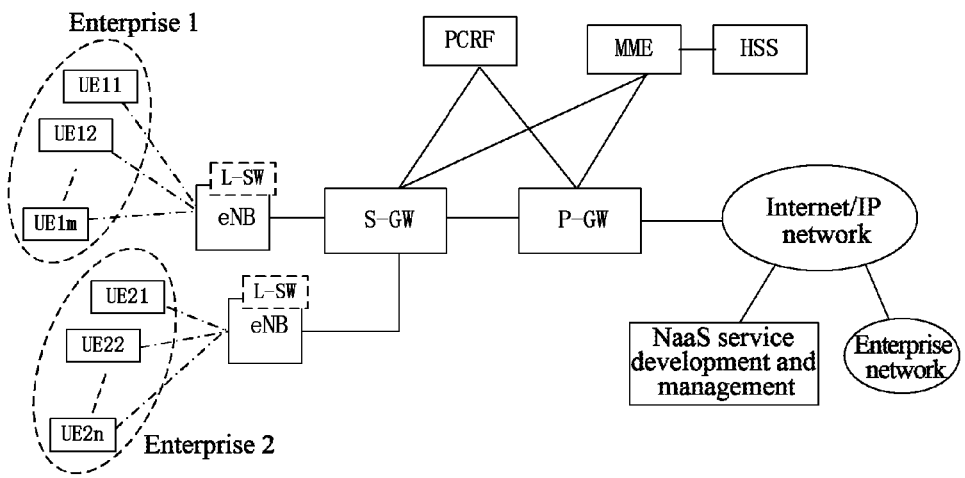
FIG. 4 is a schematic diagram of a mobile network system architecture according to an embodiment of the present document.

As shown in FIG. 4, in this embodiment, an NaaS service development and management function entity is introduced in a mobile network, the basic functions of which include: supporting a subscriber to apply a tenant network and forming related tenant network information, such as a network identifier, information indicating which UE can be used as access terminals to access the tenant network and related subscriber identity authentication information. Further, the function entity further comprises a function of performing tenant network identity authentication to related terminals to be accessed, a charging function of the related tenant network, etc.

Figure 5:
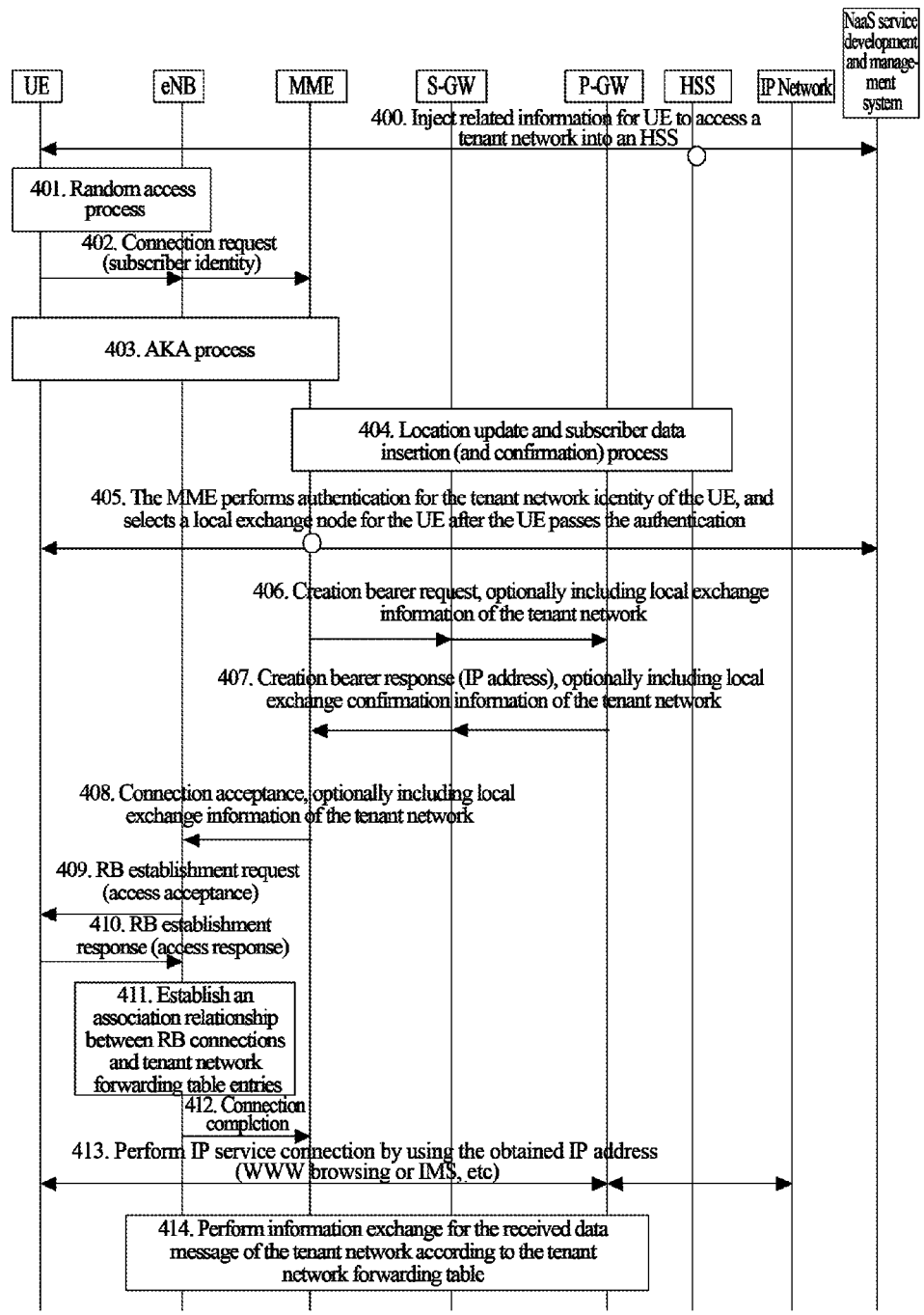
FIG. 5 is a schematic flowchart of embodiment 2 of a mobile network-based tenant network service implementation method according to the present document.

FIG. 5 illustrates a main flow of embodiment 2 for implementing tenant network service establishment in a mobile network of the present document. The main flow comprises the following steps:

In Step 400, an NaaS service development and management function entity injects related information for UE accessing a tenant network into an HSS;

A subscriber applies a tenant network to the NaaS service development and management function entity, and related network information, such as a network identifier, information indicating which UE can be used as access terminals to access the tenant network and related subscriber identity authentication information is formed. The NaaS service development and management function entity injects related information for the UE to access the tenant network into the HSS. This service application or injection of information into the HSS can be performed through manual intervention, such as manual configuration/input. Before the tenant network attribute of the related UE is injected into the HSS, the HSS needs to be extended to support the tenant network attribute of the UE. Or further, under the situation that the subscriber has registered a tenant network in a NaaS system, the access of the mobile network is a newly added access part of this tenant network.

In Step 401, it is to perform a random access process;

When a subscriber registers to a network, a Radio Resource Control (RRC) connection needs to be established between a terminal and the network through this process.

In Step 402, the terminal transmits a registration request to an MME;

The registration request includes an identity of the terminal. The identity may be an International Mobile Subscriber Identity (IMSI) and may also be an effective S-Temporary Mobile Subscriber Identity (S-TMSI).

In Step 403, it is to perform an Authentication and Key Agreement (AKA) process;

When the MME extracts the subscriber identity, the MME starts the AKA process to implement mutual authentication between the network and the terminal.

In Step 404, it is to perform a location update and insertion of subscriber data (and confirmation) process between the MME and an Home Subscriber Server (HSS);

Specifically, the MME obtains subscription information of the UE from the HSS, including tenant network attribute information of the UE.

In Step 405, the MME performs authentication on the tenant network identity for the UE, and selects a local exchange node for the UE after the UE passes the authentication;

Under the situation of supporting NaaS implementation, the MME judges whether the UE needs to access the tenant network or not according to the tenant network attribute of the UE, and if so, authentication needs to be performed to the tenant network identity of the UE.

Further, under the situation that the UE passes the identity authentication of the mobile network and the tenant network, the MME judges the situation of other access terminals of the tenant network accessed by the UE. Specifically, the MME judges whether an eNB accessed by the UE is also accessed by other access terminals of the tenant network or not, and if so, a local exchange function of the eNB needs to be activated, information (indicating information needed for generating a forwarding table, a name of the forwarding table, to which the forwarding table belongs, or possible further forwarding table attribute information, etc.) related to a local exchange forwarding table needs to be transmitted to the eNB, and specific information transmission is implemented through following steps.

It needs to be further illustrated that the eNB here is used as an example for describing the basic flow of the present document and is related to the selection of the local exchange node, the specific selection of the eNB or other network elements as the local exchange node will be described in details in following description.

The NaaS service development and management function entity allocates an IP address of the tenant network for the UE after the UE passes the identity authentication of the tenant network. The IP address here can be an INTERNET Protocol Version 4 (IPv4) or INTERNET Protocol Version 6 (IPv6) address, and can also be a public address or a private address. Generally, this IP address needs to be determined by making an agreement and a plan with the tenant network.

According to the specific deployment situation of the network, it is further illustrated that if the UE is a first access terminal in the tenant network, factors which need to be considered will be more. For example, according to a general network application situation, the tenant network generally needs to access the INTERNET or needs to access a subscriber enterprise network, the selection of the local exchange node is performed, for example, the eNB, the S-GW or the P-GW is selected as the local exchange node, and how to access the INTERNET is considered when the triggering of the local exchange function is performed.

The tenant network of the present document can be a part of the subscriber enterprise network. For example, the tenant network is a network of a new office, and this network needs to access the original network of the company or needs to simultaneously access the INTERNET.

For the first terminal which accesses the tenant network, the local exchange node selected by the MME for the terminal can be a certain eNB (which can be called as an anchor) preset according to a relative fixed office place of the subscriber of the tenant network. Thereby, a connection bearer is then established between the eNB and the P-GW, and the INTERNET access of the tenant network is implemented by the P-GW. For the detailed description of the access of the INTERNET, please refer to the following description.

Further, after the UE passes the identity authentication of the tenant network and the MME selects the local exchange network for the UE, the MME may further need to interact with the NaaS service development and management function entity to specifically report that the terminal of the tenant network has accessed, and the access start time and the information of the local exchange node, so as to support functions of the NaaS service development and management function entity such as charging, management and selection of the following local exchange node.

In Step 406, the MME transmits a bearer establishment request to the S-GW;

A basic bearer establishment request message includes UE bearer establishment. Optionally, the message may include the establishment of connection bearers used between the internal exchange nodes of the tenant network, or the establishment of access bearers/dedicated bearers of the INTERNET.

In Step 407, optionally, the P-GW performs allocation of the IP address for the subscriber and the like and returns a creation bearer response;

In this message, the IP address allocated to the subscriber is returned.

Further, this IP address may be a public network IP address for the tenant network to access the INTERNET.

Optionally, under the situation of supporting NaaS implementation, the P-GW may further support an IP address allocation function of the tenant network. Actually, this IP address can be a private IP address of the tenant network.

Further, the P-GW may not perform the allocation of the IP address for the UE, but until the UE performs IP address application by adopting a Dynamic Host Configuration Protocol (DHCP).

Further, the returned message includes the establishment confirmation information of the tenant network.

Further, preferably, under the situation that the end points of the connection bearers for the local exchange nodes are determined, it may not need to establish all bearers and this step can be omitted.

Further, the correlation between the established bearers and a Policy Control Execution Function/Policy and Charging Rules Function PCEF/PCRF of a Policy Control and Charging (PCC) function entity can be implemented, so as to support the collection of bandwidth information.

In Step 408, the MME transmits an initial context request message to the eNB, wherein the initial context request message includes a registration acceptance (also called as connection acceptance) message transmitted to the UE and the registration acceptance message carries information such as the IP address;

Further, the tenant network information of the UE is transmitted to the eNB to specifically trigger the eNB to create/update the forwarding table of the tenant network, and the associated UE information is transmitted to the eNB as a forwarding table entry. The forwarding table entry includes the identification information of the UE, which may be the IP address of the UE or other identification information of the UE such as IMSI or S-TMSI;

It is illustrated that, in the previously described step, possibly there are a plurality of IP address allocation options and the MME needs to select one allocation solution thereof according to the strategy of service development.

In Step 409, the eNB transmits a Radio Resource Control (RRC) connection reconfiguration message to the UE, wherein the RRC connection reconfiguration message carries the registration acceptance message transmitted to the UE and the registration acceptance message carries information such as the IP address;

In Step 410, after the RRC connection reconfiguration is completed, the UE transmits a RRC connection reconfiguration response message to the eNB, wherein the RRC connection has a tenant network attribute;

In Step 411, the eNB establishes a correlation relationship between the RRC connections and tenant network forwarding table entries;

Specifically, a correlated forwarding table entry corresponding to the UE includes: the UE identity/IP address and the bearer information corresponding to the UE.

In Step 412, the eNB transmits a registration completion (also called as connection completion) message to the MME;

The message includes a successful establishment message after the tenant network forwarding table is successfully established.

Further, the MME and the NaaS service development and management function entity report that one local exchange node has already completed the establishment work. Optionally, the reported information may further include the completion time information of the UE bearer establishment.

In Step 413, after the UE obtains the IP address, it is to perform related service processes (such as WWW browsing and IMS application or communication with other sites in the tenant network) through the established bearers;

In Step 414, the eNB implements the forwarding for messages transmitted from the UE or messages transmitted to the UE according to the tenant network forwarding table of the UE, thereby implementing local exchange.

In the above-mentioned process, the addition of the UE to the tenant network is implemented by adding the tenant network attribute of the UE into the HSS after subscription. The addition of the UE to the tenant network may also be explicitly performed, i.e., the UE may be used as common UE to access the INTERNET in advance. When the UE needs to access the tenant network, a tenant network access application is explicitly initiated. With respect to the processing of this application, authentication processing may be performed through the NaaS service development and management function entity. After the UE passes the identity authentication of the tenant network, the tenant network attribute of the UE is modified through the HSS and finally the related local exchange function is established through the MME. With respect to the specific implementation, the UE may apply to be added to the tenant network through a portal website of the NaaS service development and management function entity, the NaaS service development and management function entity transmits the attribute of the subscriber to the HSS after the UE passes the identity authentication of the tenant network, and the addition of the UE to the tenant network is implemented thereafter by using the similar previously described process.

Since the subscriber of the tenant network may not need an IP address of a public network, at the stage of IP address allocation, an allocation function of a private IP address for the tenant network may need to be supported. This function can be implemented through the NaaS service development and management function entity, or be implemented through the P-GW, or be implemented by forwarding it to other function entities such as a DHCP server of the tenant network. It is illustrated that, if no IP address is allocated, the IP address parameter in the previously described flow may be null or the IP address parameter is not included.

As described above, in the previously described flow, it is assumed in advance that the eNB is used as the local exchange node. The more universal selection process of the local exchange node and the solution for the tenant network to access the INTERNET will be described below in details.

(1) INTERNET Access of Tenant Network

After the first UE of the tenant network passes the tenant network identity authentication, various related aspects of the tenant network need to be arranged, including the selection of the local exchange node, optionally, the implementation of the connection between local exchange nodes under the situation that a plurality of local exchange nodes exist, and the preparation of access bearers of the INTERNET when the tenant network needs to access the INTERNET.

With respect to the INTERNET connection of the tenant network, it is illustrated that it is an optional function. Generally, for a tenant network, the INTERNET connection is generally needed. However, the INTERNET connection is not needed for some tenant networks for certain reasons. Therefore, in this process, the INTERNET connection is an option. Whether the INTERNET connection is needed or not can be determined during performing tenant network subscription, or the INTERNET connection can be dynamically applied according to service needs.

With respect to the INTERNET access, in specific implementation, in consideration of the convenience in implementation and the stability of service development, an INTERNET access node (which generally can also be used as a local exchange node) can be preset in the mobile network and is generally preset in the P-GW (when a plurality of P-GWs exist in the mobile network, one P-GW is selected as the INTERNET access point according to certain policies such as load or processing capacity of the P-GW. Other network elements such as an anchor eNB can also be preset on the premise that a local exchange anchor of the tenant network is also preset as an anchor eNB), and a dedicated bearer is established through an extended creation bearer request establishment message so as to implement the INTERNET access of the tenant network. Thus, corresponding connection bearers are established for other local exchange nodes in the tenant network to connect the other local exchange nodes to this preset node, and a local exchange forwarding table of each local exchange node includes a default routing table entry and is used for implementing the INTERNET access, so as to implement the stable INTERNET access. Thereafter, if the connection of the tenant network stably has some fixed local exchange nodes only, such as S-GW or eNB local exchange nodes only, the INTERNET connection can be optimized to the S-GW or eNB nodes, so as to save the overhead of the P-GW.

It is illustrated that the establishment process of INTERNET access bearers may be independent of the establishment process of UE bearers, and the INTERNET access bearers are established by MME by specially giving related commands. Thus, the universality is higher.

IP addresses of bearers for accessing the INTERNET can be obtained by the P-GW allocating and can also be agreed during tenant network subscription.

Specifically, the bearer establishment message of the UE can include special indicating information to indicate that this bearer is a special bearer and is specially used for accessing the INTERNET. Therefore, the IP address thereof can be carried by this message, so that the P-GW selects the carried IP address as an IP address for the tenant network to access the INTERNET. As described previously, this IP address may be a set of IP addresses, which are obtained by allocation/agreement during the tenant network subscription.

Optionally, the IP address for INTERNET access can also be allocated by the P-GW and the correlation with the local exchange node is implemented. The specific process is similar to the process for the existing UE to obtain the IP address, this IP address is returned to the MME and the MME implements the updating and synchronization of the forwarding table.

Specifically, with respect to the implementation for the INTERNET access of the tenant network, the INTERNET access can be implemented by a dedicated bearer by using a preset INTERNET access node. During the setting of the forwarding table, a default route needs to be added in a preset INTERNET access node forwarding table, a next-hop address thereof is the previously allocated IP address for the INTERNET access, and the correlation with the default route is implemented so as to implement the INTERNET access. In addition, for forwarding tables of other local exchange nodes for the tenant network, default routing table entries also need to be arranged, and a next hop thereof is a main dedicated bearer for uplink connection of the local exchange node. This process can be implemented by the MME and can also be implemented by manually configuring the forwarding table of each related local exchange node.

It is further illustrated that the INTERNET access node may be a preset node and can also be a root node of a local exchange node tree for the tenant network. In addition, the INTERNET access node is also a local exchange node of the tenant network, so as to implement the correlation with the tenant network.

(2) Selection of Local Exchange Node

If the first accessed UE is located in a preset anchor eNB thereof, the conventional processing as the previously described process is performed, i.e., an anchor eNB is selected as a local exchange node, a forwarding table is formed in the anchor eNB, and optionally, preparation work for connection with an INTERNET access node is further completed.

If the first accessed UE is not located in the preset anchor point eNB thereof, a common S-GW of an anchor eNB and the currently accessed eNB is selected to establish a local exchange forwarding table.

Further, under the situation of no common S-GW, a common P-GW is selected as a local exchange node; or under the situation that a plurality of P-GWs exist in the mobile network, i.e., under the situation that there is no common P-GW, the previously described INTERNET access point is selected as a local exchange node and a connection tunnel between the local exchange node and the P-GW is established to implement the connection of the tenant network.

It is illustrated that, optionally the local exchange node of the first UE for the tenant network also may selected to serve as a P-GW for INTERNET access. Selection can be made according to preset policies, i.e., the preset nodes can be selected as the local exchange nodes for the tenant network. Of course, the local exchange nodes may also be preset as other network elements, such as an anchor eNB of the tenant network. Specific presetting can be performed according to the actual situation of network deployment.

The processing of following UEs access can be performed by referring to the access situation of the first UE, however, the content which is compared with the first UE, thereby is not the anchor eNB any more, but is the existing local exchange node of the tenant network to which the UE belongs. The basic principle is to select a common node or a common connection node of the tenant network terminal and the existing local exchange node according to a near-terminal principle as the local exchange node of the tenant network terminal. The so-called near-terminal principle refers to selecting a common node near the terminal as much as possible in such a connection path of UE-eNB-S-GW-P-GW.

Figure 6:
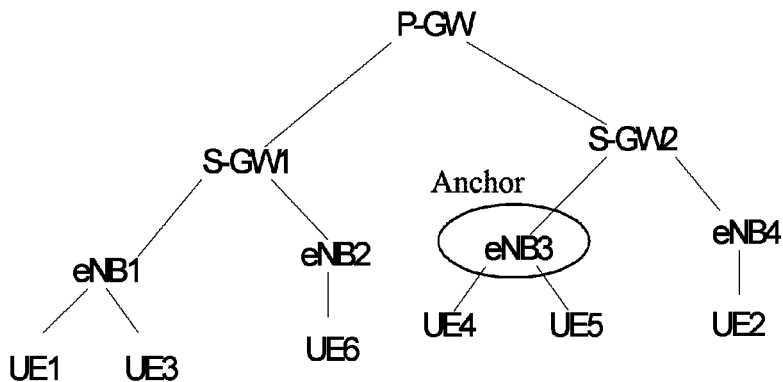
FIG. 6 is a schematic diagram of an application example of selecting a local exchange node.

Specifically, comparatively detailed description is performed by referring to FIG. 6. Numbers in UE1-UE6 in FIG. 6 represent a sequence of access. The eNB3 is a preset anchor of the tenant network.

The P-GW is selected as a local exchange node for the access of both UE1 and UE2.

The eNB1 is selected as a local exchange node for the access of UE3. Here, another processing process needs to be introduced, i.e., a connection bearer needs to be established between eNB1 and the P-GW local exchange node to perform the connection of the local exchange node and to optionally support the information interaction of the forwarding tables. Specifically, a dedicated link between two local exchange nodes can be established by a new bearer establishment message similar to the previously described bearer establishment message. In this example, the MME needs to transmit a bearer establishment message to the S-GW and then to the P-GW to establish related bearers, and these bearers are uniquely distinguished respectively by bearer identifiers/TIDs (Tunnel IDs) and are correlated with forwarding tables.

Further, the MME interacts with the eNB 1 and the S-GW1 to establish a bearer between the eNB1 and the S-GW1, and establishes correlation between the local forwarding table of the eNB1 and the radio bearer of the UE and correlation between the forwarding table and the bearer of the S-GW1.

That is to say, the establishment is performed by a bearer establishment message of UE which initiates new local exchange node establishment, or related connection bearers are established by using independent bearer establishment commands/messages, and correlation with the forwarding table of the local exchange node is implemented. Because of the access of new UE, the forwarding table is caused to be changed and all other nodes in the tenant network need to be informed about these changes. Specifically, the implementation can be performed by the MME since the MME has already known all information of the tenant network. The specific operation is that, the MME transmits the forwarding table entry information of the new UE to all related local exchange nodes to generate a table entry corresponding to the UE in the local forwarding table. Specifically, next-hop information for each local exchange node to connect to the UE needs to be provided in the table entry. For example, if the UE is UE3, a table entry of the UE3 needs to be added in the forwarding table of the P-GW, and the next-hop information thereof refers to a bearer/connection directed to the eNB1 local exchange node and is generated according to the previously described bearer establishment command.

The S-GW2 is selected as a local exchange node for the access of UE4. Similarly, the generation of a table entry of the S-GW2 local exchange node need to be completed, and the connection between the S-GW2 local exchange node and the existing local exchange nodes need to be established. Here, the connection refers to the connection between the S-GW2 local exchange node and the P-GW. In addition, the synchronization of the table entry between different exchange nodes which is similar to that of UE3 needs to be used.

The eNB3 is selected as a local exchange node for the access of UE5. Processing of connection between the eNB3 and the S-GW2 is needed, which can refer to the flow described in the access of the UE3. At this moment, the eNB3 is a local exchange node of a next layer, the S-GW2 is a local exchange node of a previous layer, a connection/bearer is established between the local exchange node eNB3 of the next layer and the local exchange node S-GW2 of the previous layer, this bearer needs to be associated with a default route for a local forwarding table of the next layer or is used as a next-hop interface for the UE which is located in a non-local exchange node, so that other UEs located in the non-local exchange node can be accessed. For the local exchange node of the previous stage, this bearer is a next-hop interface of the UE accessing the local exchange node of the next stage or a next-hop IP address. Thus, the local forwarding tables of the entire tenant network can be associated to implement forwarding. The local forwarding tables also need to be synchronized.

The S-GW1 is selected as a local exchange node for the access of UE6. Connection between eNB1-S-GW1-P-GW needs to be adjusted.

A plurality of local exchange nodes selected by the MME for the tenant network above form an exchange node tree.

It needs is illustrated that the so-called anchor local exchange node just has a reference meaning and does not have any special function in the processing flow.

Besides, FIG. 6 provides a very bad case for local exchange, although this case possibly occurs in actual network service deployment. A comparatively ideal and common case is that all UEs of the tenant network are centralized at one local exchange node, especially located in the eNB. With respect to the extreme case as shown in FIG. 6, control in the aspect of some policies can be performed. For example, when it is found that the terminals of the tenant network are comparatively dispersed, distribution at local exchange nodes may not be performed but the local exchange is centralized at the P-GW, i.e., the complexity of network processing is reduced by bandwidth. Or, the selection of the local exchange node needs to satisfy the limitation to certain numbers. For example, the local exchange node is set only when a plurality of UEs need to simultaneously access the same exchange node, and otherwise, the local exchange node is not set. This can make an agreement during tenant network subscription according to the possible distribution situation of terminals connected to the tenant network, and the MME is informed by a subscription attribute value so as to perform corresponding processing. Of course, this processing flow will become complex.

It is further illustrated that the introduction here is described mainly by using the eNB as a radio access point. In LTE/SEA network architecture, radio access points corresponding to the eNB may also comprise different radio access equipments of radio access points such as Home eNB (HeNB) or small cell. However, the HeNB and the small cell are logically equivalent to the eNB. Therefore, the contents of the present document also support service implementation when the HeNB and the small cell are used.

(3) Synchronization of Tenant Network Local Forwarding Table

When the forwarding tables are caused to be changed because new UE access or UE stop accessing, or local exchange nodes are newly added, the MME is responsible for informing all other local exchange nodes of the tenant network about these changes to implement the synchronization of the forwarding tables of all local exchange nodes for the tenant network. Specifically, the synchronization can be implemented by the MME because the MME has already known all related information of the tenant network. The specific operation is that the MME transmits forwarding table entry information of the new UE to all related local exchange nodes to generate table entries corresponding to the UE in the local forwarding tables.

Further, the MME knows specific locations of all local exchange nodes for the tenant network and owns a connection relationship between the eNB, the S-GW and the P-GW according to the actual physical connection of the network, i.e., the MME owns the network topology of the mobile network. Therefore, after the local exchange node is selected, the connection relationship between all local exchange nodes of the tenant network is determined thereupon, or the MME can determine the selection of the local exchange node.

Further, since the INTERNET access needs to be supported, for a route for accessing an external network, all local exchange node forwarding tables of the same tenant network include a default forwarding table entry for accessing the INTERNET, a bearer associated with the forwarding table entry is an uplink connection bearer of the current local exchange node.

Further, when the tenant network supports the connections of other networks, the related connection or routing information can be injected into the local forwarding table by the MME. A specific forwarding table entry includes an IP address/prefix and a corresponding dedicated offload bearer, i.e., a network connection/connection tunnel for implementing offload.

Further, since the MME needs to perform many functions, a great number of tenant networks need to be processed during the NaaS service development process and the subscriber number may be at a scale of millions in a specific network deployment, the synchronization of related forwarding tables may cause a huge burden to the MME at this moment. Therefore, this function can be separated out from the MME, or for example, the synchronization processing of the forwarding tables is implemented by the NaaS service development and management function entity. As previously described, actually the NaaS service development and management function entity also owns comprehensive tenant network topology information. Of course, the NaaS service development and management function entity needs to obtain the comprehensive topology information of the mobile network by interacting with the MME or by configuration. Of course, the forwarding table synchronization can also be implemented by other independent function entities, which does not influence the substantive features of the present document.

In addition, the synchronization of the related forwarding tables by adopting the traditional routing protocol mechanism is not excluded and is not repetitively described here.

Embodiment 3

With respect to the processing of roaming subscribers such as cross-network roaming subscribers or cross-P-GW subscribers, a secure tunnel needs to be established between the P-GWs to implement the connection to the tenant network thereof. Specific tunneling technologies can be determined by the agreement between clients and operators according to the functions of network equipments.

With respect to the processing of subscribers who roam to places outside the permanent residence places, since the tenant network is still within the range of the same P-GW, the access of the tenant network can be implemented by using the local exchange function of the P-GW.

Specific steps may refer to the embodiment 1.

In Step 601, under the situation that UE accesses to a mobile network or roams to a new mobile network, a mobile network of a visited place performs authentication on an identity for a subscriber and updates the location.

The mobile network of the visited place generally only performs identity authentication of the mobile network because the visited network may not support NaaS service development and thus may not know the existence of an attribute of a tenant network.

In Step 602, under the situation that the UE belongs to a tenant network, a connection with the tenant network of a home network is established under the support of the mobile network of the visited place. In specific implementation, a possible solution is to establish a secure tunnel between the visited place P-GW and the home P-GW and a bearer of the UE in the visited network is corresponded to the secure tunnel, so as to securely and reliably access the tenant network under the situation of UE roaming. Or, a Home Routed mechanism is directly used to direct the bearer of the roaming UE back to the P-GW of the home network, so as to then associate the bearer with the local exchange and thereby implement the tenant network service.

It is illustrated that, in order to simplify the complexity of implementation, for roaming UE, local exchange processing similar to that in the home network is not performed in the visited network, but the UE enters the tenant network directly through the separate bearer of the UE.

However, it is technologically feasible to enable a processing process similar to that of embodiment 1 to implement local exchange under the situation that a plurality of UEs exist in the visited network and local exchange exists.

Embodiment 4

Figure 7:
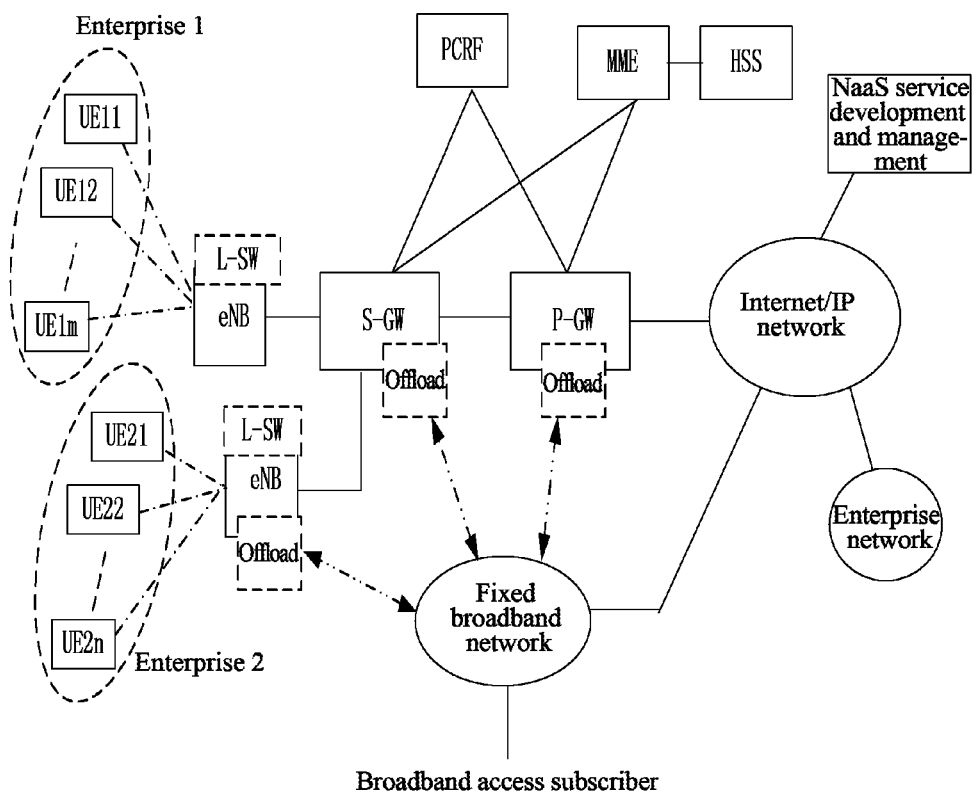
FIG. 7 is a schematic diagram of the network architecture that a mobile network supports offload.

As shown in FIG. 7, under the situation that a mobile network supports offload, nodes such as eNB will offload services which are originally processed by a mobile core network to a broadband network, such that the investment of the core network can be greatly reduced and the advantages of the broadband network can be fully utilized. With respect to specific offload policies, generally offload is implemented by subscriber attributes or service traffic attributes in the prior art. Relative to the mobile network, equipments which support offload of the mobile network needs to be connected to the broadband network by an offload link.

Although local exchange has already implemented in the tenant network, the local exchange of the tenant network is different from the offload of the mobile network to some extent in both aspects of application scenarios and strategies for implementing offload. If it is needed to implement offload of NaaS services, a new attribute needs to be added hereby and the offload can be implemented according to the tenant network attribute. However, generally this offload feature is not directly used.

Optionally, the offload, which may further implement the mobile network is only used as an access solution for NaaS implementation of the fixed network, or contrarily, the fixed network adopting the offload can be used as an access way for the NaaS implementation solution of the mobile network. Thus, the NaaS implementation solution in which the convergence of the mobile network and the fixed network is supported can be realized.

Specifically, there are two possible situations. The first possible situation is that the NaaS/tenant network implemented by the mobile network uses the broadband network by adopting offload to implement the INTERNET connection. Thus, the influence on the mobile network can be reduced. That is to say, by adopting offload, some traffic of the tenant network, especially INTERNET access traffic, flow into other networks which are generally broadband networks here from local exchange nodes, and then flow into the INTERNET, but not uniformly flow into the INTERNET through the P-GW, so that the traffic which flow through the core network are reduced. In a specific implementation, a possible method is to forward all traffic which do not belong to the tenant network to offload networks by configuring a default route of the local forwarding table.

The second possible situation is that the tenant network implemented by the mobile network needs to implement intercommunication and secure connection with the tenant network implemented by the fixed network. Specifically, a secure connection tunnel needs to be established between the tenant network of the mobile network and the tenant network of the fixed network. This can be implemented by a tunnel between offload node equipments such as an eNB and an offload broadband network node. For example, generally Virtual Local Area Network (VLAN) partitioning can be performed on an interface link of the two sets directly connected equipment (which generally can be equipment such as exchanges or routers) to implement isolation, and the VLAN is respectively configured into the tenant networks in the mobile network and the fixed network. Or, under the situation of no direct link connection, the isolation can be implemented by tunneling technologies, such as IP-in-IP tunnels, in particular Generic Routing Encapsulation (GRE) tunnels, INTERNET Protocol Security (IPsec) tunnels or Multi-Protocol Label Switching (MPLS) Label Switching Path (LSP) tunnels.

It is further illustrated that, the local exchange node equipment is automatically selected in general by the method of the present document, and generally the setting of offload tunnels is manually completed. Although this can implement the development of services, defects that the services cannot be very conveniently and quickly developed exist. One solution is to extend the functions of offload nodes to support automatic configuration of related offload tunnels and associate related parameters, so as to implement automatic service development of offload. Related offload connection equipment in corresponding broadband networks also need to support the function of automatic configuration. The related functions of the NaaS service development and management function entity also needs to be extended. Specifically, service offload attributes of related tenant networks and related judgment processing are added. Under the situation that an offload demand is required, if the offload is INTERNET services generally, the offload can be implemented by directly configuring the forwarding table entries of offload nodes; and under the situation that the NaaS service development for implementing fixed and mobile convergence with broadband networks, automatic configuration commands and related tunnel parameters need to be issued to related nodes of the fixed network and the mobile network, and after the related node equipment complete automatic configuration, the automatic development of the service is implemented.

By using offload connection, another function which can be implemented is that other computer equipment or other network equipment can be accessed to realize further functions such as firewalls and Dynamic Host Configuration Protocol (DHCP) servers. In a specific implementation, IP addresses or aggregated IP addresses of the equipments can be injected into the forwarding table of the tenant network by the MME and can correspond to the offload connection, so as to implement the intercommunication at the network level. Of course, when the MME performs route injection, the MME also needs to implement the synchronization of the forwarding table for the tenant network.

Embodiment 5

An important aspect of NaaS service development is that subscribers of a tenant network need to be charged. The implementation of charging is performed according to a series of parameters related to consumption of network resources by the tenant network and related policies. Specifically, clients of the tenant network are charged according to parameters such as time that UE access to the tenant network, bandwidth used by UE, the number of UE accessing the tenant network (the related parameter is the maximum number of subscribed access UE), whether the UE roams or not, whether local offload is supported or not, usage of network functions including address allocation or DHPC or/and DNS functions and firewalls, and interconnection bandwidth for further access of the INTERNET or between different sites.

In order to implement comparative accurate charging of the tenant network, various related parameters of the tenant network need to be considered, wherein some data such as the number of maximum accessible UEs for the tenant network are fixed, while other parameters, especially parameters related to the usage situation of the resource, such as duration that the UE access the network or the number of local exchange nodes occupied by the tenant network, need to be acquired in real time according to the access situation of the UE. Specifically, dynamic data acquisition includes determination of access time of the UE, specifically according to access start time of the UE and access stop time/power-off or dormant state, and includes collection of charging data such as the number and change situation of the involved local exchange nodes according to the access distribution situation of the UE.

With respect to the specific charging data acquisition, the recording of related information can be implemented by the related steps of the previously described embodiment.

Figure 8:
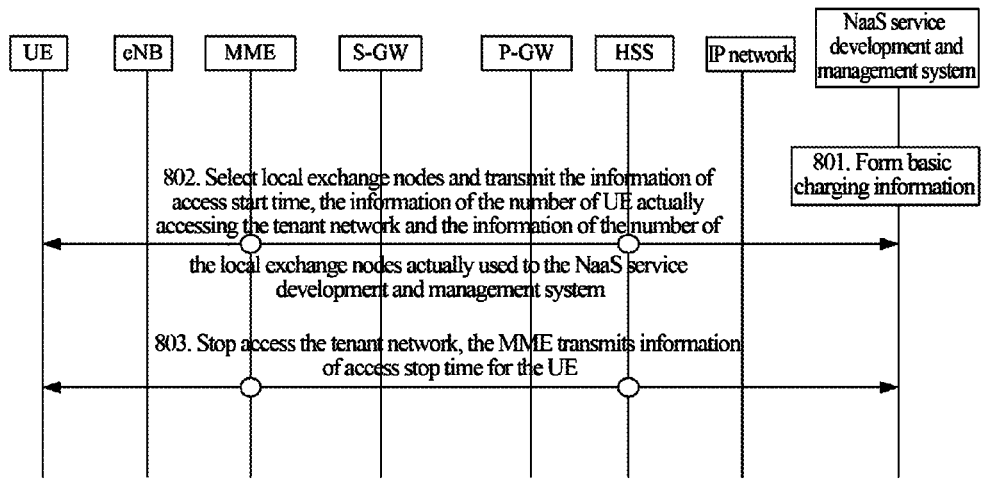
FIG. 8 is a schematic diagram of an embodiment of a mobile network-based tenant network service charging method.

Specifically, a mobile network-based tenant network service charging method comprises the following steps:

In Step 701, an NaaS service development and management function entity collects charging information of a tenant network;

As shown in FIG. 8, step 701 specifically comprises the following steps:

In Step 801, the NaaS service development and management function entity forms basic charging information of the tenant network when subscribers applying/subscribing tenant network services;

The basic charging information includes the maximum number of UEs accessing the tenant network, a related connection bandwidth, etc. A specific bandwidth includes but not limited to an access bandwidth of the UE, a bandwidth of a home network to which roaming is connected back, an INTERNET access bandwidth of the tenant network, an offload link bandwidth, a link bandwidth between the local exchange nodes, etc.

In Step 802, an Mobility Management Entity (MME) of a mobile network transmits the information of the access start time, the information of the number of UEs actually accessing the tenant network and the information of the number of local exchange nodes actually used to the NaaS service development and management function entity after UEs which access the tenant network passes the identity authentication of the tenant network and the local exchange nodes are selected for the UE, and the NaaS service development and management function entity performing statistics on actual numbers;

During roaming, location update information can be obtained by an HSS and thus the related location update information is also reported to the NaaS service development and management function entity.

In Step 803, When the UE stopping to access the tenant network, the MME transmits information of the access stop (possibly including situations that the UE is powered off, the UE is in a dormant state or explicitly quits tenant network access, etc., which can be distinguished according to the existing technologies of the mobile network in combination with information collection and transmission in the present document, and charging can be performed respectively according to preset policies) time of the UE to the NaaS service development and management function entity, and the NaaS service development and management function entity performs statistics on a UE access duration; or further, when the information of the tenant network such as the number of the local exchange nodes is changed, the MME informs the NaaS service development and management function entity, so as to facilitate the NaaS service development and management function entity to perform extraction and statistics on charging information.

In Step 702, the NaaS service development and management function entity performs tenant network charging according to preset strategies and the collected charging information of the tenant network.

The NaaS service development and management function entity performs one-time charging to the access of the UE according to the access start time and the access stop time of the UE, wherein the charging information is used as the composition information of charging for the tenant network.

In addition to the number of the UE actually accessing the tenant network, the access duration of the UE accessing to the tenant network and the number of the local exchange nodes provided by the MME, the charging information of the tenant network collected by the NaaS service development and management function entity further includes actual access bandwidth.

The actual access bandwidth is obtained by the NaaS service development and management function entity by further interacting with a Policy Control and Charging (PCC) function entity PCRF, and specifically includes access bandwidth of the UE, connection bandwidth of the local exchange nodes, and/or INTERNET access bandwidth, etc. For the collection of the bandwidth data, related functions of the existing PCC needs to be extended in the bearer establishment process, such that the PCC is connected with these bearers to establish an association relationship, the collection can be implemented by using the existing PCC mechanism, and reporting to and interaction with the NaaS service development and management function entity are performed. Or further, for connection between the local exchange nodes, the statistics on the bandwidth can be directly performed by the local exchange nodes, the local exchange nodes interact with the MME and the MME then informs the NaaS service development and management function entity, thereby implementing the collection of the charging information as well.

The NaaS service development and management function entity monthly performs charging of the tenant network. Specific charging policies can include charging according to basic subscription attributes including the maximum number of access UEs, offload, INTERNET access, local exchange and use of DHCP or/and DNS functions which form basic charging parameters, the number and distribution situation of further specific local exchange nodes, and specific access number and duration of the UE. It is illustrated the charging of the mobile network NaaS can also be implemented by adopting a monthly payment mode. With respect to specific charging strategies, expenses/rates can also be determined according to certain strategies by referring to the previously described related parameters of the tenant network.

It is further illustrated that the UE is universal, thus the UE is limited within the tenant network during tenant network service development, and the INTERNET services thereof is also implemented by the tenant network. In order to guarantee the universality of the UE, such function that the UE can explicitly put forward that the UE is not a part of the tenant network and can directly use the mobile network shall be supported. Of course, the UE uses the current popular traffic and charging strategy. This charging strategy needs to be associated with the charging of NaaS. Specific factors include but not limited to the change of the maximum number of access UEs subscribed for NaaS.

Figure 9:
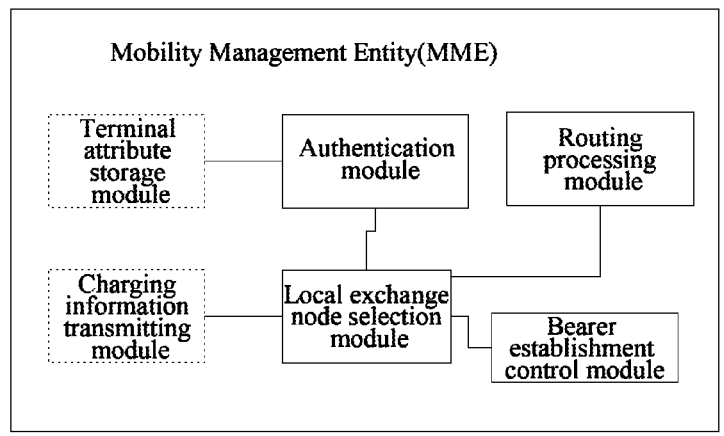
FIG. 9 is a schematic diagram of a module structure of an MME Mobility Management Entity (MME) according to an embodiment the present document.

In order to realize the above-method, the present document provides a Mobility Management Entity (MME). As shown in FIG. 9, the MME comprises:

an authentication module, configured to perform tenant network identity authentication to User Equipment (UE) which passes the mobile network access authentication when the UE has a tenant network attribute;

a local exchange node selection module, configured to select a local exchange node for the UE after the UE passes the tenant network identity authentication;

a bearer establishment control module, configured to initiate bearer establishment of the UE, establishment of connection bearers between local exchange nodes and establishment of bearers accessing the INTERNET;

a routing processing module, configured to transmit a creation/update message for a local exchange forwarding table to the local exchange node.

Optionally, the MME further comprises a terminal attribute storage module configured to store an attribute of a terminal, the attribute includes a tenant network attribute of the tenant network terminal, and the authentication module performs identity authentication to the tenant network terminal according to the tenant network attribute.

Specifically, the local exchange node selection module selects a preset local exchange node or selects a common node of the tenant network terminal and the existing local exchange node as the local exchange node of the tenant network terminal according to a near-terminal principle. Optionally, the local exchange node is an evolved Node B (eNB), an Home eNB (HeNB), a small cell, a Serving Gateway (Serving Gateway) or a Packet Data Network Gateway (P-GW).

The local exchange node selection module of the MME selects one or more local exchange nodes for tenant network terminals located in the same tenant network.

Preferably, when the local exchange node is an S-GW or a P-GW, the creation/update message of the local exchange forwarding table of the UE is born by extending a creation bearer request message; and when the local exchange node is an eNB or an HeNB or a small cell, the creation/update message of the local exchange forwarding table of the UE is born by extending a connection acceptance request message.

Preferably, the authentication module or the local exchange node selection module of the MME interacts with a NaaS service development and management function entity to implement the identity authentication of the tenant network or the selection of the local exchange node.

The MME further comprises a charging information transmitting module configured to transmit the charging information to the NaaS service development and management function entity, and the charging information includes the number of UE actually accessing the tenant network, access start and stop time of the UE accessing the tenant network, and the number of local exchange nodes.

When the local exchange forwarding table of a certain local exchange node is changed or a local exchange node is newly added, the routing processing module is also configured to be responsible for completing synchronization of forwarding tables of all local exchange nodes for the tenant network.

The dedicated bearers comprise dedicated bearers for implementing INTERNET access of the tenant network and dedicated bearers between the local exchange nodes of the tenant network, and the bearer establishment control module establishes the bearers by an extended bearer establishment message.

Figure 10:
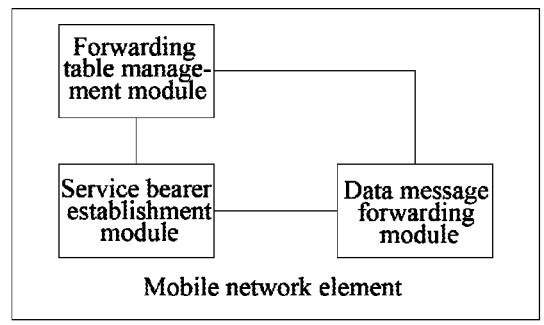
FIG. 10 is a schematic diagram of a module structure of a mobile network element used as a local exchange node according to an embodiment of the present document.

As shown in FIG. 10, the present document further provides a mobile network element, mobile network element comprises a forwarding table management module, a service bearer establishment module and a data message forwarding module, and when the mobile network element is used as a local exchange node of a tenant network:

the bearer establishment module is configured to establish bearers, wherein the bearers comprise UE bearers and connection bearers between the local exchange nodes of the tenant network, bearers accessing the INTERNET or offload network connection/connection tunnel bearers;

the forwarding table management module is configured to receive a creation/update message of a local exchange forwarding table of a tenant network terminal transmitted by a Mobility Management Entity (MME), create or update a local exchange forwarding table, generate or update a forwarding table entry of the tenant network terminal, and write UE bearer information into the forwarding table entry of the UE after UE bearers are established, wherein the forwarding table entry comprises identification information of the UE; and the data message forwarding module is configured to forward data messages of the tenant network terminal according to the forwarding table of the tenant network terminal.

Specifically, the mobile network element is a common node or a common connection node between an MME or the UE selected according to a near-terminal principle and the existing local exchange node.

The mobile network element is an eNB, an HeNB, a small cell, an S-GW or a P-GW.

Preferably, the bearers established by the bearer establishment module further comprise connection bearers accessing the INTERNET and connection bearers or offload connection tunnels between the local exchange nodes.

Optionally, the local exchange nodes support performing statistics on the traffic which flows through the bearers between the local exchange nodes of the tenant network and report the statistic information to the MME.

Figure 11:
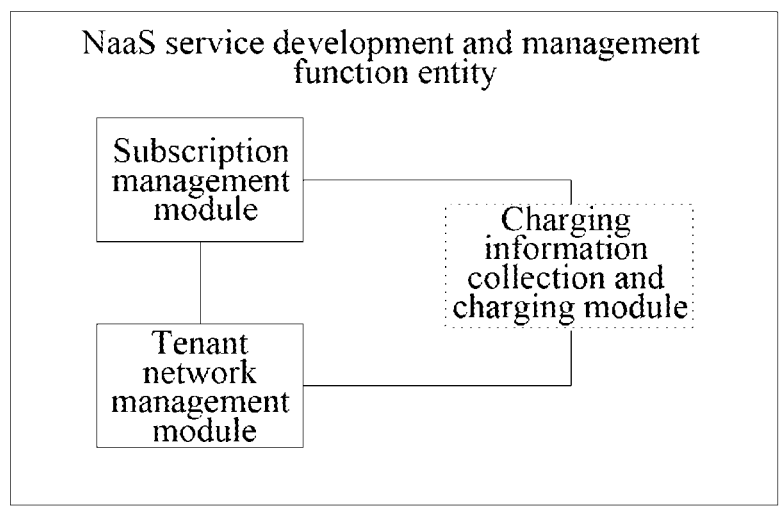
FIG. 11 is a schematic diagram of a module structure of an NaaS service development and management function entity according to an embodiment of the present document.

The present document further provides a Network as a Service (NaaS) service development and management function entity. As shown in FIG. 11, the function entity comprises:

a subscription management module, configured to accept and manage service application or subscription of a tenant network; and a tenant network management module, configured to manage a terminal accessing to the tenant network.

Optionally, the function entity further comprise a charging information collection and charging module configured to form basic charging information based on the service application or subscription information of the tenant network, receive tenant network charging information transmitted by a Mobility Management Entity (MME) and perform charging processing according to the collected charging information.

Optionally, the tenant network management module is also configured to support an MME to perform tenant network identity authentication to a UE or select a local exchange node.

Optionally, the tenant network management module is also configured to allocate an IP address for a tenant network terminal, or support to plan a route of the tenant network, and implement the synchronization the forwarding table of the tenant network under the support of the MME.

The invention further provides a mobile network-based tenant network service implementation system, which comprises the Mobility Management Entity (MME) shown in FIG. 6, the mobile network element shown in FIG. 10, and the Network as a Service (NaaS) service development and management function entity shown in FIG. 11.

It is illustrated that the present document describes the implementation flow of the present document by taking an LTE-SAE network as an example, but it is not indicated that the present document is limited to be only used for the LTE/SAE network. The concept of the present document can also be introduced into other mobile networks, such as World Interoperability for Microwave Access (WiMAX) or Wideband Code Division Multiple Access (WCDMA). Of course, related functions of the present document need to be correspondingly distributed and adjusted in these networks.

According to the above-mentioned methods and system, by introducing the NaaS service development and management function entity into the mobile network and extending a function of a related network element of the existing mobile network, a function of network as a service can be implemented, thus the service range of the existing mobile network can be greatly extended, new incomes are brought to the mobile network operators and the resource utilization ratio of the mobile network is improved.

The above-mentioned embodiments are just preferred embodiments of the present document and are not intended to limit the present document. For one skilled in the art, various modifications and changes can be made to the present document. However, any modification, equivalent substitution, improvement and the like made within the spirit and the principle of the present document shall be included in the protection scope of the present document.

INDUSTRIAL APPLICABILITY

The above-mentioned methods and systems, by introducing the NaaS service development and management function entity into the mobile network and extending a function of a related network element of the existing mobile network, a function of network as a service can be implemented, thus the service range of the existing mobile network can be greatly extended, new incomes are brought to the mobile network operators and the resource utilization ratio of the mobile network is improved.

What we claim is:

1. A mobile network-based tenant network service charging method, comprising:
    a Network as a Service (NaaS) service development and management function entity collecting charging information of a tenant network; and
    the NaaS service development and management function entity performing tenant network charging according to preset strategies and the collected charging information of the tenant network;
    wherein the step of collecting charging information of the tenant network comprises:
        the NaaS service development and management function entity forming basic charging information of the tenant network when subscribers apply/subscribe tenant network services;
        a Mobility Management Entity (MME) of a mobile network transmitting information of an access start time, information of a number of User Equipments (UEs) actually accessing the tenant network, and information of a number of local exchange nodes actually used to the NaaS service development and management function entity after the UE which has accessed the tenant network passes identity authentication of the tenant network and the MME selects a local exchange node for the UE, and the NaaS service development and management function entity performing statistics on actual numbers; and
        the MME transmitting information of an access stop time of the UE to the NaaS service development and management function entity when the UE stops accessing the tenant network, and the NaaS service development and management function entity performing statistics on access durations of the UE.

2. The method according to claim 1, wherein the basic charging information of the tenant network includes a maximum number of UEs accessing the tenant network and a related connection bandwidth, and the connection bandwidth includes an access bandwidth of the UE, a bandwidth of a home network to which roaming is connected back, an INTERNET access bandwidth of the tenant network, a offload link bandwidth and a link bandwidth between the local exchange nodes of the tenant network.

3. The method according to claim 1, wherein the charging information of the tenant network collected by the NaaS service development and management function entity comprises: the number of the UEs actually accessing the tenant network, the access duration of the UE accessing the tenant network, the number of local exchange nodes and an actual access bandwidth.

4. The method according to claim 3, wherein the actual access bandwidth is obtained by the NaaS service development and management function entity interacting with a Policy Control and Charging (PCC) function entity, and comprises an access bandwidth of the UE, a connection bandwidth between the local exchange nodes or an INTERNET access bandwidth.

5. A Network as a Service (NaaS) service development and management function entity, comprising:
    a subscription management module, configured to accept and manage service application or subscription of a tenant network; and
    a tenant network management module, configured to manage a terminal accessing the tenant network;
    a charging information collection and charging module configured to form basic charging information based on the service application or subscription information of the tenant network, receive tenant network charging transmitted by a Mobility Management Entity (MME) comprising information of an access start time, information of a number of User Equipments (UEs) actually accessing the tenant network, and information of a number of local exchange nodes actually used to the NaaS service development and management function entity after the UE which has accessed the tenant network passes identity authentication of the tenant network and the MME selects a local exchange node for the UE, perform statistics on the actual numbers, receive information of an access stop time of the UE when the UE stops accessing the tenant network from the MME, perform statistics on access durations of the UE, and perform charging processing according to the collected charging information.

6. The NaaS service development and management function entity according to claim 5, wherein the tenant network management module is also configured to support the MME performing tenant network identity authentication on the UE or selecting a local exchange node.

7. The NaaS service development and management function entity according to claim 5, wherein the tenant network management module is also configured to allocate an IP address for the tenant network terminal.

* * * * *